US 6,658,248 B1

(12) United States Patent
Lee

(10) Patent No.: US 6,658,248 B1
(45) Date of Patent: Dec. 2, 2003

(54) SELF-SERVICE MACHINE OPERATED BY COMMUNICATIONS TERMINAL, AND SERVICE PROVIDING METHOD THEREOF

(76) Inventor: Chul-ho Lee, 601-1 Hwangkeum-dong, Susong-ku, Taegu (KR)

( * ) Notice: Subject to any disclaimer, the term of this patent is extended or adjusted under 35 U.S.C. 154(b) by 0 days.

(21) Appl. No.: 09/432,593

(22) Filed: Nov. 3, 1999

(30) Foreign Application Priority Data

Nov. 9, 1998 (KR) ............................................. 98-47828

(51) Int. Cl.⁷ ................................................. H04Q 7/20
(52) U.S. Cl. ....................... 455/422; 419/420; 419/414; 419/412; 419/66; 419/458; 340/5.9; 340/5.91; 340/5.92; 340/825.36
(58) Field of Search ................................. 455/422, 419, 455/420, 88, 405, 352, 517, 414, 412, 406, 458, 466, 413, 66, 38.1, 38.2; 340/825.35, 825.36, 5.9, 5.91; 379/92.03, 93.04, 93.12, 102.01

(56) References Cited

U.S. PATENT DOCUMENTS

| | | | |
|---|---|---|---|
| 3,027,299 A | * | 3/1962 | Croix |
| 4,412,292 A | * | 10/1983 | Sedam et al. ................ 364/479 |
| 5,640,002 A | * | 6/1997 | Ruppert et al. ............. 235/472 |
| 5,671,362 A | * | 9/1997 | Cowe et al. ................. 395/228 |
| 5,920,821 A | * | 7/1999 | Seazholtz et al. ........... 455/466 |
| 6,003,019 A | * | 12/1999 | Eaton et al. .................... 705/42 |
| 6,038,491 A | * | 3/2000 | McGarry et al. ............ 700/231 |
| 6,058,304 A | * | 5/2000 | Callaghan et al. .......... 455/422 |
| 6,101,379 A | * | 8/2000 | Rahman et al. ............. 455/406 |

FOREIGN PATENT DOCUMENTS

JP HEI 60152773 10/2000

* cited by examiner

Primary Examiner—Lester G. Kincaid
Assistant Examiner—Marceau Milord
(74) Attorney, Agent, or Firm—Nikon & Vanderhye, P.C.; Frank P. Presta

(57) ABSTRACT

A self-service machine using a communications terminal and a service providing method thereof. The self-service machine includes an antenna for receiving a radio signal including identification information of the self-service machine and price information, a radio transceiver for processing the radio signal from the antenna, an information processor for extracting the price information from the signal processed by the radio transceiver if the identification information from the radio transceiver is identical to its actual identification information, a controller for controlling the self-service machine so as to provide a predetermined service according to the price information from the information processor, a service providing unit for providing the predetermined service under the control of the controller, and a memory for storing predetermined information about the service provided by the self-service machine after the provision of service by the service providing unit. Therefore, the self-service machine such as a vending machine or a ticket vending machine, can be used by a cellular phone or a wire/wireless telephone, without the need for cash or a card.

17 Claims, 6 Drawing Sheets

SELF-SERVICE MACHINE OPERATED BY COMMUNICATIONS TERMINAL, AND SERVICE PROVIDING METHOD THEREOF

BACKGROUND OF THE INVENTION

1. Field of the Invention

The present invention relates to a self-service machine which dispenses merchandise or tickets in repose to the input of cash or a card, and more particularly, to a self-service machine, capable of providing service by receiving information which is transmitted by a communications terminal, and a service providing method thereof.

2. Description of the Related Art

Vending machines for selling various items including tickets are widespread in cities. When a customer inserts a coin, bill or card, into a slot, the vending machine recognizes the insertion, and dispenses items or tickets selected by the customer. Such a coin- or bill-operated vending machine has been applied to measure the blood alcohol concentration of a driver, or to wash vehicles. However, in the case where a customer does not keep cash or a card acceptable for a specific vending machine, the customer is inconvenienced by not being provided with a desired service.

SUMMARY OF THE INVENTION

It is an object of the present invention to provide a self-service machine operated by a communications terminal such as a cellular phone and a wired/wireless telephone, without the above inconvenience.

It is another object of the present invention to provide a service providing method of the self-service machine using a communications terminal.

To achieve the first object of the present invention, there is provided a self-service machine capable of providing a predetermined service using a communications terminal, the machine comprising: an antenna for receiving a radio signal including identification information of the self-service machine and price information; a radio transceiver for processing the radio signal from the antenna; an information processor for extracting the price information from the signal processed by the radio transceiver if the identification information from the radio transceiver is identical to its actual identification information; a controller for controlling the self-service machine so as to provide a predetermined service according to the price information from the information processor; a service providing unit for providing the predetermined service under the control of the controller; and a memory for storing predetermined information about the service provided by the self-service machine after the provision of service by the service providing unit.

Preferably, the information processor generates an acknowledge signal which indicates the reception of the radio signal, if the identification information from the radio transceiver is identical to the actual identification information of the self-service machine, the radio transceiver changes the acknowledge signal into a radio signal and transmits the radio signal to the antenna, and the antenna outputs the radio signal.

Preferably, the identification information of the self-service machine and the price information are input by a predetermined communication terminal and received by the antenna through a predetermined communication system.

Preferably, the communication system uses a radio paging communications network, a cellular phone communications network, or a telephone communications network.

Preferably, the communication system comprises a voice mail service (VMS) system which accepts identification information of the self-service machine and the price information as voice, and charges a price according to the input price information.

To achieve the second object of the present invention, there is provided a service providing method of a self-service machine capable of providing a predetermined service using a communications terminal, the method comprising the steps of: (a) connecting to a predetermined communications system using the wire/wireless communications terminal; (b) receiving identification information of the self-service machine and the price information from the wire/wireless communications terminal, and transmitting the input information to the communications system; (c) sending the identification information of the self-service machine and the price information, as a radio signal, from the communications system; (d) receiving the radio signal and extracting the identification information of the self-service machine and the price information from the radio signal in the self-service machine; and (e) if the extracted identification information is identical to the actual identification information of the self-service machine, providing a service corresponding to the input price information and storing predetermined information about the service.

BRIEF DESCRIPTION OF THE DRAWINGS

The above objects and advantages of the present invention will become more apparent by describing in detail preferred embodiments thereof with reference to the attached drawings in which.

DESCRIPTION OF THE PREFERRED EMBODIMENTS

Prior to description of embodiments, the term "self-service machine" will now be defined. A self-service machine includes a series of vending machines capable of providing various services such as dispensing purchased items or tickets, in response to the insertion of cash or a card.

Figure 1:
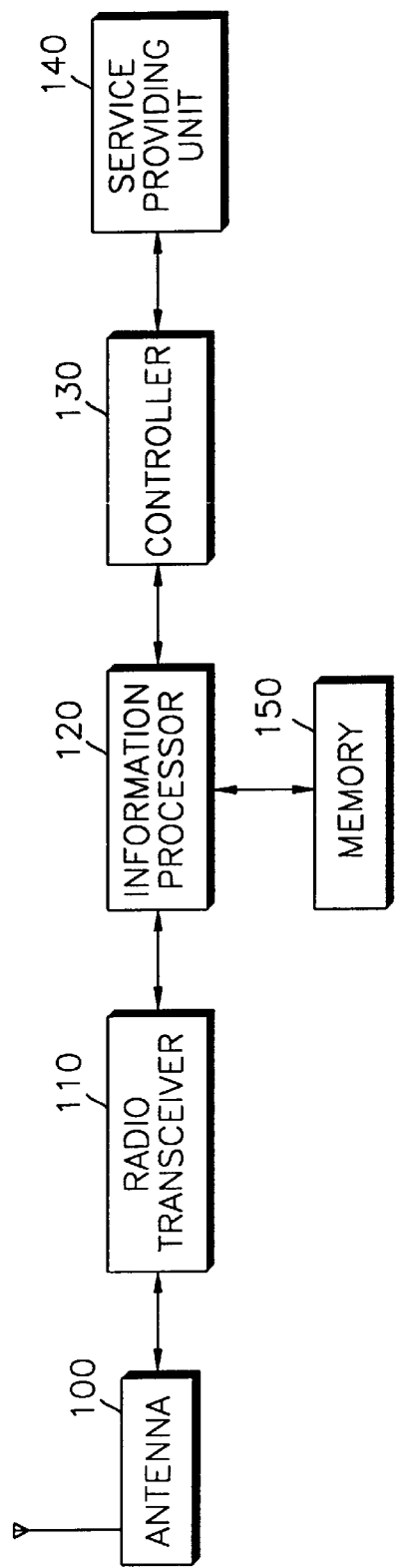
FIG. 1 is a block diagram of a self-service machine according to a preferred embodiment of the present invention.

FIG. 1 is a block diagram of a service machine according to an embodiment of the present invention. The service machine comprises an antenna 100, a radio transceiver 110, an information processor 120, a controller 130, a service providing unit 140 and a memory 150.

The antenna 100 receives a radio signal including at least identification information and price information. As circumstances require, the antenna 210 may transmit a radio signal such as an acknowledge (ACK) signal, to an external communications network 210 shown in FIG. 2. The external communications network 210 may be a radio paging communications network, a cellular phone communications network or a telephone communications network.

Figure 2:
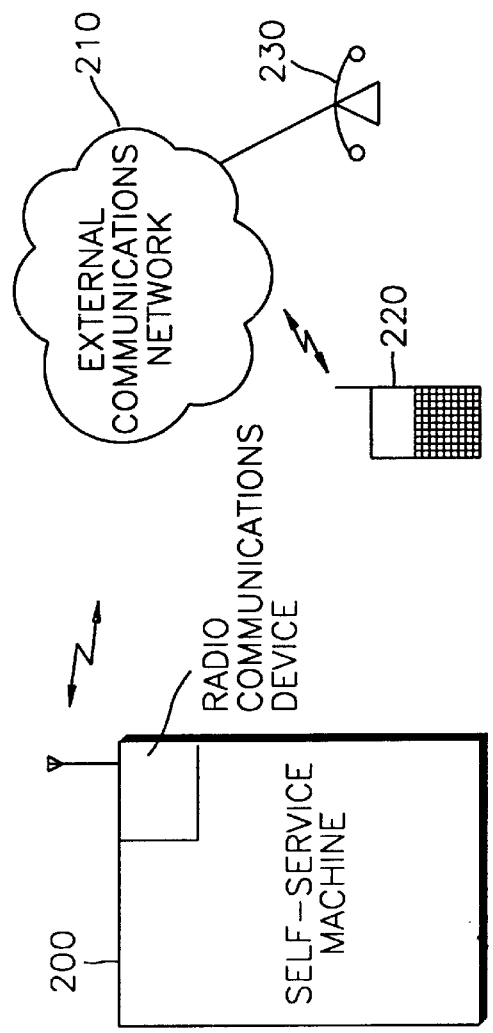
FIG. 2 shows a self-service machine according to the present invention and an external communications network.

When a customer wants to purchase merchandise or tickets, the customer connects to the external communications network 210 using a communication terminal such as cellular phone 220 or wire/wireless telephone 230 (see FIG. 2). Then, the user enters a price request under the guidance of a voice mail system (VMS) provided by the external communications network 210. The price information provided through the communications terminal is transmitted to the external communications network 210 and is used to charge the customer for the merchandise or tickets the customer selects. Also, the price information is transmitted to a self-service machine 200 via the external communications network 210 and the customer is served according to the price information.

The radio transceiver 110 performs a wireless reception function for receiving a radio signal through the antenna 100 and processing the input radio signal, and performs a wireless transmission function in response to the reception of the radio signal. When a radio paging communications network is used as the external communications network 210, the radio transceiver 110 only receives the radio signal without transmission. The wireless reception function includes demodulation of the radio signal received through the antenna 100, and other processes, for example, changing the frequency into an intermediate frequency, according to the needs of a system. The wireless transmission function includes a predetermined signal process according to the needs of an actual system, for example, a frequency modulation, which is required to send an ACK signal to the external communications network 210 from the self-service machine.

The information processor 120 extracts an identification information of the service machine from the signal processed by the radio transceiver 110, and extracts the price information from the signal processed by the radio transceiver 110 if the extracted identification information is identical to the self-service machine's actual ID number. The information processor 120 may further comprise a reception confirming portion (not shown) for generating an ACK signal in response to the signal received from the external communications network 210 according to circumstances.

The controller 130 controls the self-service machine so as to provide a predetermined service corresponding to the price information extracted by the information processor 120. The service providing unit 140 provides predetermined services under the control of the controller 130. These services includes general services which can be served to a customer on the insertion of cash or card. The memory 150 stores information about the service provided by the service providing unit 140, in order to inform the owner of the service machine of the sales by using a communications terminal. The information stored in the memory 150 includes the items sold, the number of the items sold, or information about the customer, depending on the enviroment of a system.

Figure 3:
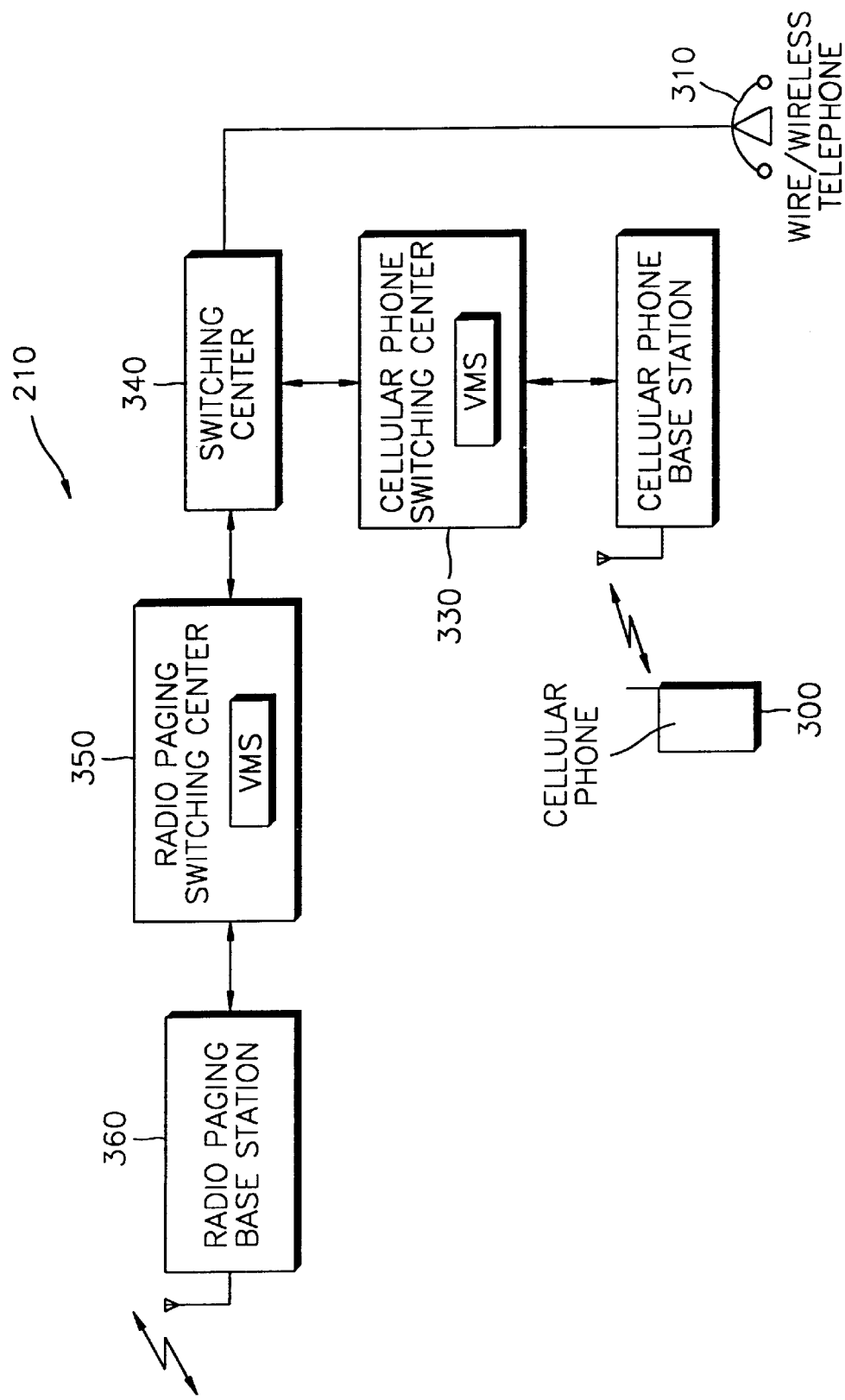
FIG. 3 shows an example of a radio paging communications network used as the external communications network.

FIG. 3 shows an example of a radio paging communications network which can be used as the external communications network 210 of FIG. 2. The radio paging communications network comprises a cellular phone 300 or wire/wireless telephone 310, a cellular phone base station 320, a cellular phone switching center 330, a switching center 340, a radio paging switching center 350 and a radio paging base station 360. The structure of each block of FIG. 3 is the same as that of a general radio paging communications network, thus an explanation thereof is not provided. A voice mail system (VMS) of the cellular phone switching center 330 provides a user of the cellular phone 300 with various services such as price information or directions of use, or asks for a password, through the cellular phone base station 320.

Figure 4:
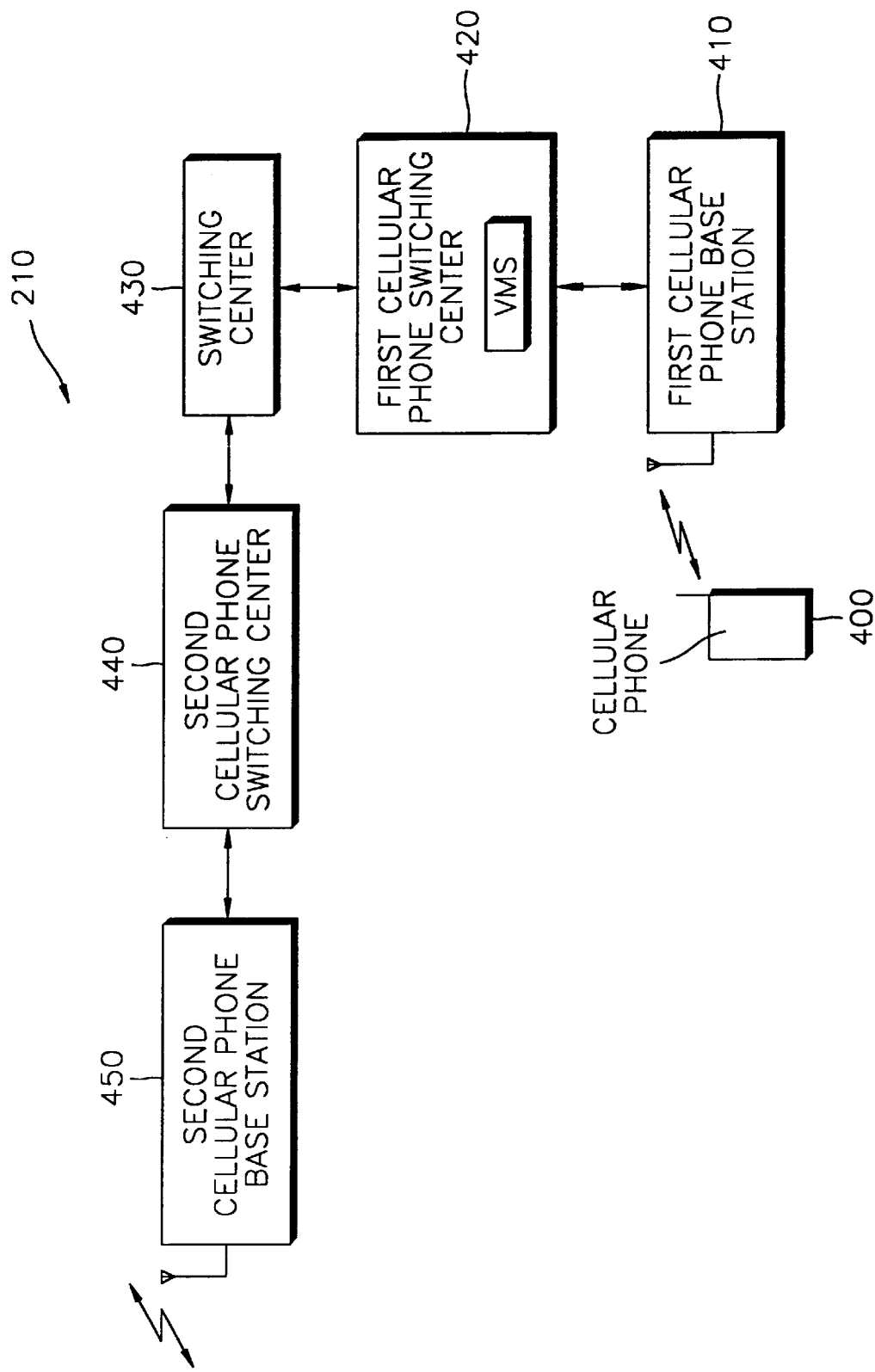
FIG. 4 shows an example of a cellular phone communications network used as the external communications network.

FIG. 4 shows an example of a cellular phone communications network which can be used as the external communications network 210 of FIG. 2. The cellular phone communications network comprises a cellular phone 400, a first cellular phone base station 410 and a first cellular phone switching center 420 for the cellular phone 400, a second cellular phone base station 450 and a second cellular phone switching center 440 for a self-service machine (not shown) and a switching center 430 located between the first cellular phone switching center 420 and the second cellular phone switching center 440. The structure of each block of FIG. 4 is the same as that of a general cellular phone communications network, thus explanation thereof is omitted. As in the radio paging communications network of FIG. 3, a VMS of the first cellular phone switching center 420 of FIG. 4 can provide a user of the cellular phone 400 with various services, such as price information, or directions of use, or ask for a password, through the first cellular phone base station 410.

Figure 5:
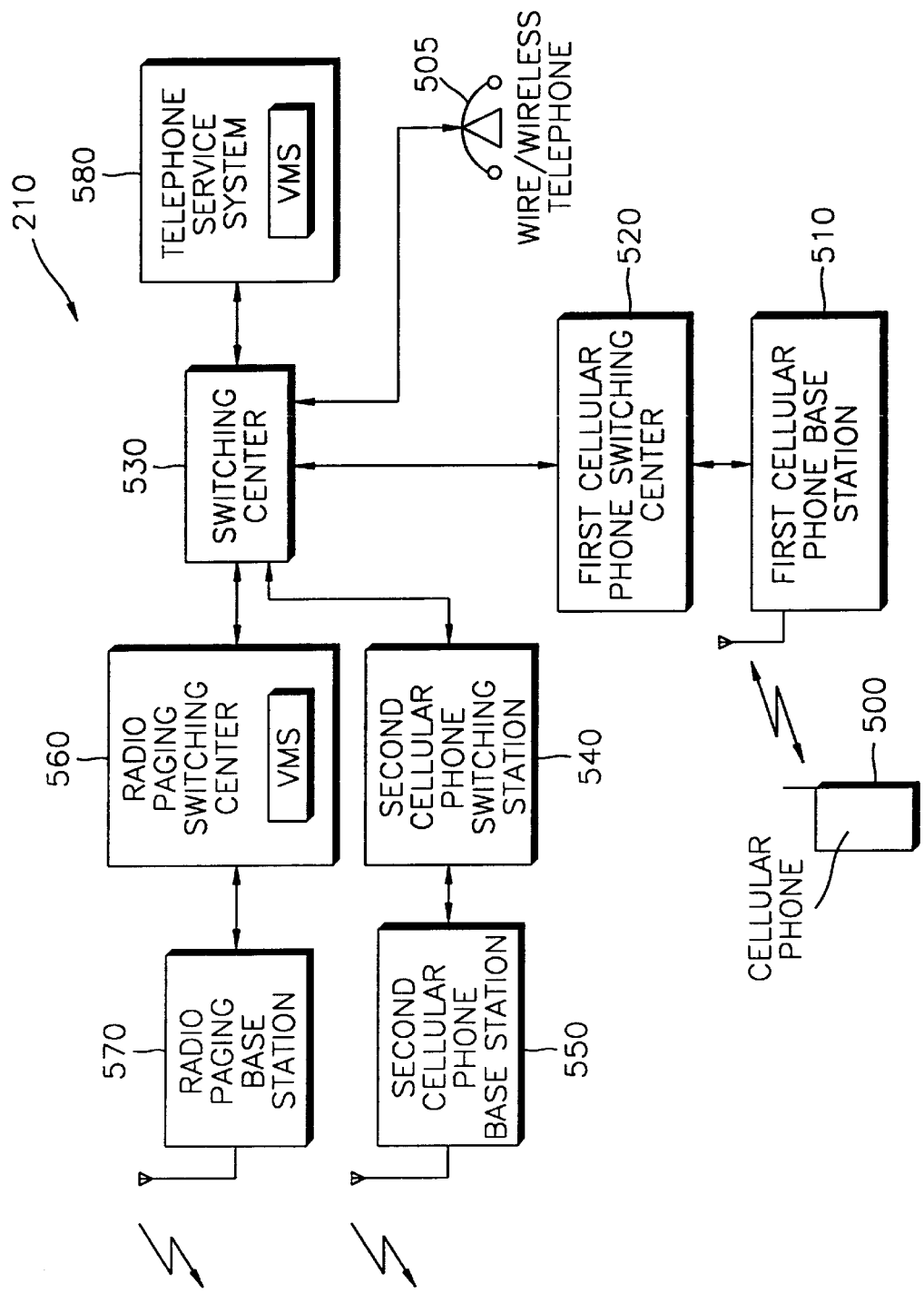
FIG. 5 shows an example of a telephone communications network used as the external communications network.

FIG. 5 shows an example of a telephone communications network which can be used as the external communications network 210 of FIG. 1. A cellular phone 500 or a wire/wireless telephone 505 is available as a communications terminal. When a user uses the cellular phone 500, the user can access a telephone service system 580 via a first cellular phone base station 510, a first cellular phone switching center 520 and a switching center 530 in sequence. Also, when a user uses the wire/wireless telephone 505, the user can directly access the telephone service system 580. Then, when the user enters a price request using the VMS of the telephone service system 580, the price information is transmitted to the self-service machine via the radio paging switching center 560 and the radio paging base station 570 for radio paging, or via the second cellular phone switching center 540 and the second cellular phone base station 550 for bidirectional radio telecommunications, so that the self-service machine can provide the user with a predetermined service. In FIG. 5, the owner of the telephone service sends a bill including the prices of items dispensed, rather than the owner of the cellular phone communications network or the owner of the radio paging communications network.

Figure 6:
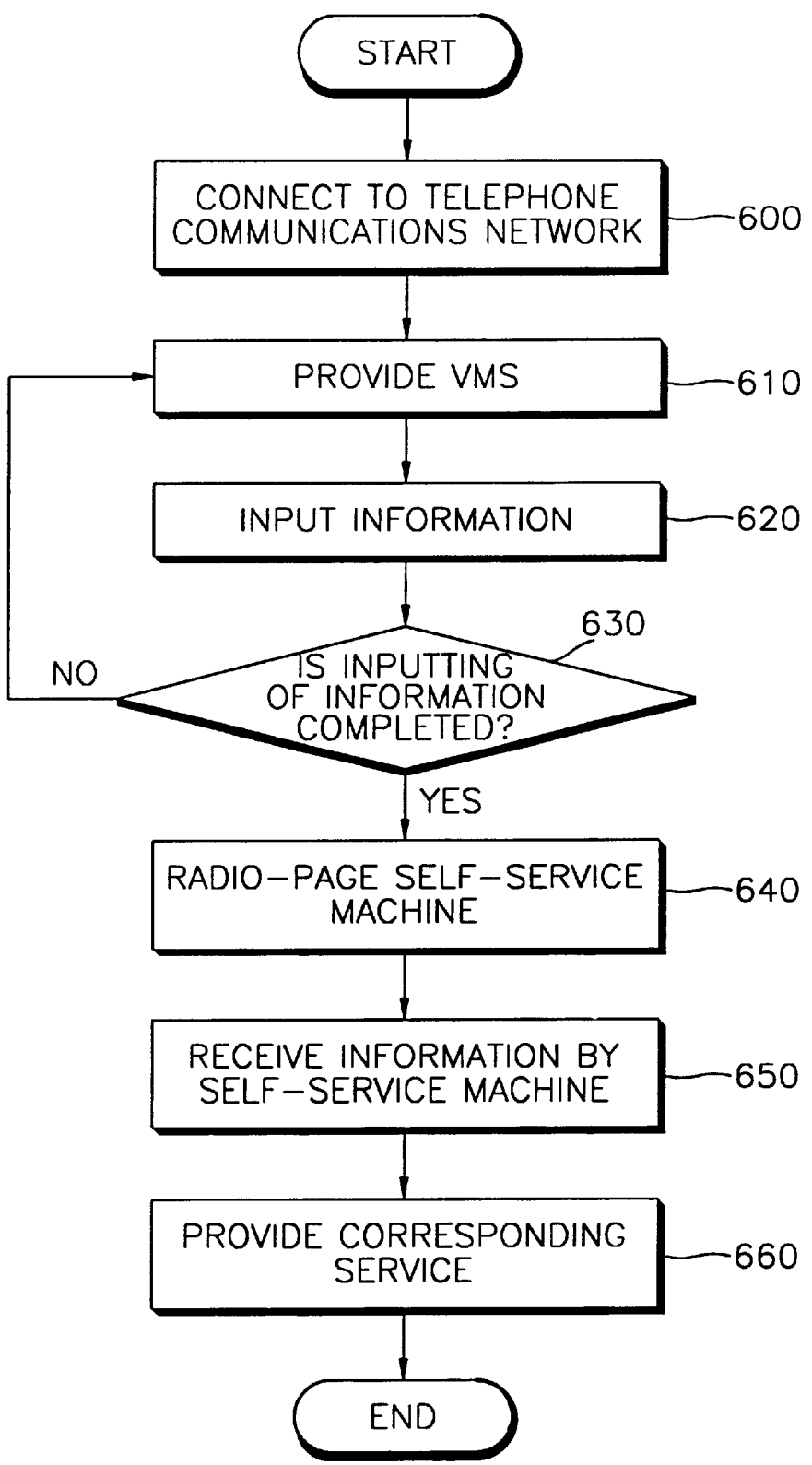
FIG. 6 is a flowchart illustrating a service providing method of the machine using the telephone communications network.

In the operation of the self-service machine according to the present invention using the telephone communications network (see FIG. 6), a customer who wants a service from a self-service machine, calls the VMS of the telephone communications network using a wire/wireless telephone or a cellular phone (step 600). The VMS provides information about directions for use or price, or asks for the password (step 610), and the user enters information required for using the self-service machine under the guidance of the VMS, using the communications terminal (step 620). After the user completes entering the information (step 630), the self-service machine is connected through radio paging (step 640). Then, the self-service machine receives a radio signal including the ID information of the self-service machine and the price information (step 650). If a bidirectional communications device rather than a device for radio paging is installed in the self-service machine, the self-service machine can send an ACK signal in response to the radio signal. If the transmitted ID information is identical to the self-service machine's actual ID number, the self-service machine extracts the price information from the transmitted radio signal and provices the corresponding service to the user (step 660). For example, if the self-service machine is a coffee vending machine, the self-service machine dispenses a cup of coffee to the user.

Figure 7:
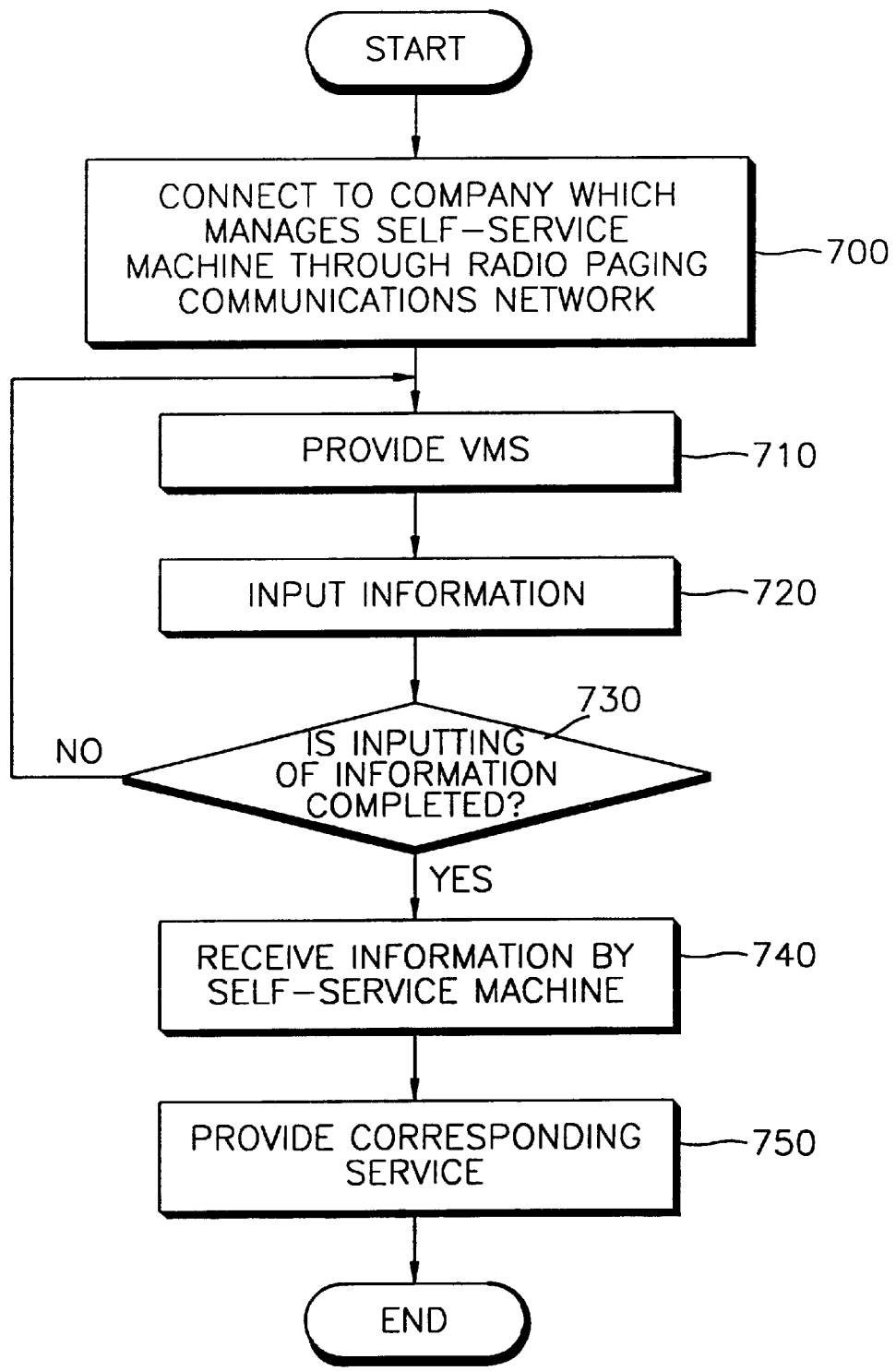
FIG. 7 is a flowchart illustrating a service providing method of the machine using the radio paging communications network or the cellular phone communications network.

FIG. 7 is a flowchart illustrating the operation of a self-service machine using the radio paging communications network or the cellular phone communications network. A user calls a company which manages the self-service machine through radio paging using a cellular phone or wire/wireless telephone (step 700). Then, the company for managing the self-service machine provides VMS which includes the directions of use (step 710). The user enters the information required for use under the guidance of the VMS (step 720). When the inputting of information is completed (step 730), the self-service machine receives the input information (step 740). If the ID number contained in the transmitted information is identical to the self-service machine's ID number, the self-service machine provides the service corresponding to the input price information (step 750). If a bidirectional communications device such as a cellular phone is installed in the self-service machine, the self-service machine can send an ACK signal on the reception of the information.

As described above, a customer can use a self-service machine such as a vending machine for selling merchandise or tickets, using a communications terminal such as a cellular phone or a wire/wireless telephone, without the need for cash or a specific card.

While this invention has been particularly shown and described with reference to preferred embodiments thereof, it will be understood by those skilled in the art that various changes in form and details may be made therein without departing from the spirit and scope of the invention as defined by the appended claims.

What is claimed is:

1. A self-service machine capable of providing a predetermined service to a user using a communications terminal, without requiring the use of the cash, coins or credit or debit cards, the machine comprising:
   an antenna for receiving a radio signal from the user through a predetermined external communication system, which charges a price according to a price information input by the user using the communications terminal, including identification information of the self-service machine and price information;
   a radio transceiver for processing the radio signal from the antenna;
   an information processor for extracting the price information from the signal processed by the radio transceiver if the identification information from the radio transceiver is identical to its actual identification information;
   a controller for controlling the self-service machine so as to provide a predetermined service to the user according to the price information from the information processor;
   a service providing unit for providing the predetermined service to the user under the control of the controller; and
   a memory for storing predetermined information about the service provided by the self-service machine after the provision of service by the service providing unit.

2. The self-service machine of claim 1, wherein the information processor generates an acknowledge signal which indicates the reception of the radio signal, if the identification information from the radio transceiver is identical to the actual identification information of the self-service machine, the radio transceiver changes the acknowledge signal into a radio signal and transmits the radio signal to the antenna, and the antenna outputs the radio signal.

3. The self-service machine of claim 1, wherein the self-service machine is a vending machine.

4. The self-service machine of claim 1, wherein the self-service machine is a ticket vending machine.

5. The self-service machine of claim 1, wherein the external communication system uses a radio paging communications network.

6. The self-service machine of claim 1, wherein the external communication system uses a cellular phone communications network.

7. The self-service machine of claim 1, wherein the external communication system uses a telephone communications network.

8. The self-service machine of claim 1, wherein the external communication system comprises a voice mail service (VMS) system which accepts identification information of the self-service machine and the price information as voice, and charges a price according to the input price information.

9. A service providing method for a self-service machine capable of providing a predetermined service to a user using a wire/wireless communications terminal, without requiring the use of cash, coins or credit or debit cards, the method comprising the steps of:
   (a) connecting to a predetermined external communications system, which charges a price according to a price information input by the user using the wire/wireless communications terminal;
   (b) receiving identification information of the self-service machine and the price information for the wire/wireless communications terminal, and transmitting the input information to the external communications system;
   (c) sending the identification information of the self-service machine and the price information, as a radio signal, from the external communications system;
   (d) receiving the radio signal and extracting the identification information of the self-service machine and the price information from the radio signal in the self-service machine; and
   (e) if the extracted identification information is identical to the actual identification information of the self-service machine, providing a service to the user corresponding to the input price information and storing predetermined information about the service.

10. The service providing method of claim 9, wherein the self-service machine is a vending machine.

11. The service providing method of claim 9, wherein the self-service machine is a ticket vending machine.

12. The service providing method of claim 9, wherein the communications system is a radio paging communications network.

13. The service providing method of claim 9, wherein the communications system is a cellular phone communications network.

14. The service providing method of claim 9, wherein the communications system is a telephone communications network.

15. The service providing method of claim 9, wherein in the step (b) the identification information of the self-service machine and the price information are input by voices in response to voice instructions of a voice mail system (VMS)

of the communications system, and the communications system charges a price according to the input price information.

16. The service providing method of claim 9, further comprising the step of sending an acknowledge signal which indicates the reception of information, if the input identification information is identical to the actual identification information of the self-service machine.

17. A self-service system capable of providing a predetermined service from a self-service machine to a user using a communications terminal, without requiring the use of cash, coins or credit or debit cards, the system comprising:

a predetermined external communication system which charges a price according to price information input by the user using the communications terminal, including identification information of the self-service machine and price information;

said self-service machine comprising:

an antenna for receiving a radio signal from the user through said predetermined external communication system;

a radio transceiver for processing the radio signal from the antenna;

an information processor for extracting the price information from the signal processed by the radio transceiver if the identification information from the radio transceiver is identical to its actual identification information;

a controller for controlling the self-service machine so as to provide a predetermined service to the user according to the price information from the information processor;

a service providing unit for providing the predetermined service to the user under the control of the controller; and a memory for storing predetermined information about the service provided by the self-service machine after the provision of service by the service providing unit.

* * * * *